(12) United States Patent
Fossum

(10) Patent No.: US 7,315,274 B2
(45) Date of Patent: Jan. 1, 2008

(54) METHOD AND SYSTEM FOR DETERMINING THE POSITION OF MARINE VESSELS AND SIMILAR OBJECTS

(75) Inventor: Björn Fossum, Trondheim (NO)

(73) Assignee: Kongsberg Seatex AS, Trondehim (NO)

( * ) Notice: Subject to any disclaimer, the term of this patent is extended or adjusted under 35 U.S.C. 154(b) by 102 days.

(21) Appl. No.: 10/533,656

(22) PCT Filed: Mar. 15, 2005

(86) PCT No.: PCT/NO2005/000091

§ 371 (c)(1),
(2), (4) Date: May 5, 2005

(87) PCT Pub. No.: WO2005/088343

PCT Pub. Date: Sep. 22, 2005

(65) Prior Publication Data

US 2006/0044179 A1   Mar. 2, 2006

(30) Foreign Application Priority Data

Mar. 15, 2004   (NO) .................................. 20041088

(51) Int. Cl.
G01S 7/40    (2006.01)
G01S 13/82   (2006.01)
G01S 13/93   (2006.01)

(52) U.S. Cl. ............................. 342/44; 342/23; 342/41; 342/47; 342/174

(58) Field of Classification Search ............ 342/41–48, 342/50, 107, 128–133, 455–458
See application file for complete search history.

(56) References Cited

U.S. PATENT DOCUMENTS

| | | | | |
|---|---|---|---|---|
| 4,060,809 A * | 11/1977 | Baghdady | .................... | 342/451 |
| 4,203,113 A * | 5/1980 | Baghdady | .................... | 342/71 |
| 4,292,637 A * | 9/1981 | Johnson | ....................... | 342/44 |
| 4,464,662 A * | 8/1984 | Tomasi | ......................... | 342/87 |
| 4,679,047 A * | 7/1987 | Tomasi | ......................... | 342/52 |
| 5,254,997 A * | 10/1993 | Cohn | ........................... | 342/44 |
| 5,731,778 A * | 3/1998 | Nakatani et al. | ............. | 342/70 |
| 6,084,530 A * | 7/2000 | Pidwerbetsky et al. | .. | 340/10.32 |
| 6,100,840 A * | 8/2000 | Zidek et al. | .................. | 342/42 |
| 6,370,475 B1 * | 4/2002 | Breed et al. | ................. | 701/301 |
| 6,597,308 B2 * | 7/2003 | Isaji | ............................. | 342/70 |
| 2005/0012653 A1 * | 1/2005 | Heide et al. | .................. | 342/42 |
| 2006/0044179 A1 * | 3/2006 | Fossum | ........................ | 342/46 |

FOREIGN PATENT DOCUMENTS

GB           1313928          4/1973

\* cited by examiner

*Primary Examiner*—Thomas Black
*Assistant Examiner*—Shelley Chen
(74) *Attorney, Agent, or Firm*—Dennison, Schultz & MacDonald

(57) ABSTRACT

A method for determining the relative position between two or more objects in a marine environment, including waterways, of which at least one object can be maneuvered relative to one or more other objects. At least one interrogator is arranged on one or more of the objects and sends a radio wave signal to at least one transponder arranged on one or more of the other objects. The novel method is the use of a FMCW radar in the interrogator, the use of the transponders for including identity tags into the signals to be reflected to the interrogator, and attitude determination. A system for this determination is also described.

17 Claims, 5 Drawing Sheets

METHOD AND SYSTEM FOR DETERMINING THE POSITION OF MARINE VESSELS AND SIMILAR OBJECTS

This application is a filing under 35 USC 371 of PCT/NO2005/000091 filed Mar. 15, 2005.

The present invention relates to a method, for determining the position, especially for a marine vessel in relation to other vessels or installations, by use of radar frequency signals. It also relates to a system for such determination.

BACKGROUND OF THE INVENTION

In connection with the offshore petroleum industry, it is often required to position a vessel in immediate proximity to a harbour, a platform or similar, to be able to carry out loading and unloading of goods, and to load oil and gas onto large vessels etc. However, this may be extremely difficult far out at sea, where huge waves and high wind affect the movement of the vessel. Some platforms also float in such a way that both the vessel and the platform move independently of each other. In the North Sea, a series of cases has been reported, wherein vessels have hit an adjacent platform. This may lead to damage on the vessel, the platform, and the crew, and also cause leakage of oil and gas, which leads to pollution, and the danger of explosion. As a consequence of this, it is desirable to automatically position the vessel in relation to the platform, which is is done by use of a dynamic positioning system (DP-system). The method and the system according to the present invention is a reference system which provides input in such a DP-system.

Today the petroleum industry demands several independent reference systems based on different principles, as inputs to such DP systems. The DP manufacturers and their users have demanded systems with more robustness, ease of use, and integrity properties related to this type of usage.

The reference systems currently utilised for relative positioning applications comprises:

Laser based systems, e.g. "Fanbeam" (trademark) from MDL (Measurement Devices Ltd, UK).

These systems utilise a laser to track passive light reflectors, and typically outputs the distance and bearing to each reflector. These systems utilise a scanning laser device to track the reflectors. The laser based systems have severe limitations, i.e. tracking of false targets (reflectors), reduced accuracy and loss of signal due to sunlight saturation as well as absorption and loss of signal due to snow, heavy rain or fog in the path of the laser light. Another severe limitation is low reliability due to movable parts (motor and gearbox) driving the scanning lasers. In addition heavy roll and pitch may cause the narrow laser beam to loose track of targets.

GPS based systems.

These systems compare measurements against the GPS satellites, and transmit the data over some form of radio link between the vessel and the structure it is positioning itself relative to, and compute the relative distance and bearing between the vessel and the target system.

The GPS based systems are quite good and are based on technology with high reliability and low maintenance cost. However, it can be vulnerable to degraded satellite constellation, specifically if the vessel is near a large structure that is blocking the view of the horizon.

Radar based systems, e.g. "Artemis" (trademark) from CHL NETHERLANDS B.V. and "RadaScan" (trademark) from GCS (Guidance Control Systems), UK These systems utilise a conventional rotating radar antenna both on the vessel and at the remote station. The "Artemis" measures the distance and bearing between two stations, and the antennas are always aligned with each other. This system can only track one target, and can only be used by one vessel at a time. It is expensive, and reliability is an issue due to the engine controlled antennas. The "RadaScan" is described in Modulated Microwave Position & Heading Reference Sensor, Jan Grothusen, Dynamic Positioning Conference, Sep. 16-17, 2003). This system utilises conventional rotating radar antenna with its inherent limitations, and measures its position relative to identifiable transponders.

Patent application EP 0 777 133 A1 presents FM-CW radar apparatus (FMCW—Frequency Modulated Continuos Wave) for determination of the distance and the relative velocities for a number of targets in connection with anti-collision systems for automobiles. Radar technology is described in detail in "Radar Handbook", Skolnik 1970.

U.S. Pat. No. 6,084,530 presents a radio communication system comprising an interrogator which generates a continuous radio signal. One or several tags in the system receive the radio signal, and a modulator modulates the reflection of the radio signal by use of a carrier signal and uses this to create a reflected and modulated signal. The signal is once again received by the interrogator, which based on the frequency of the carrier signal, can determine the identity of the tag. The system also is able to show vibrations or movements within the tag.

SUMMARY OF THE INVENTION

The general object of the present invention is to provide a method and a system for determining position by use of radar technology, where the distance, the direction, and the relative velocity between an interrogator and one or several transponders is simultaneously measured and calculated.

An object is to create measurements "blind" to objects other than the identifiable transponders to be measured relative to, and thereby make a more reliable positioning system than prior art systems do.

A primary object is to overcome the shortcomings of other systems and to provide users with a flexible and robust solution for short range positioning. Key elements are:

Robustness of measurements. The system has to be based on measurements not easily affected by external interference or environmental conditions.

The system has to meet the demands for high reliability and low maintenance cost.

The system has to meet the price competition of existing systems in the market.

The system has to be based on mass produced components.

At least one transponder modulates an identifier frequency into the signal from the interrogator prior to the reflection of this signal to a series of antenna elements in the interrogator, which, based on the frequency of the carrier signal can determine the identity of the signal, and based on this the position data is determined.

The modulated signal from the transponder solves three different issues. The signals are unique for each transponder, making it possible to distinguish between the different transponders used in the system. The signal modulated by the transponders relocates the reflected radar signal, making it possible to exclude all "clutter" conventional radars have to allow for. The removal of all other reflections from the signal makes it possible to utilise several receiving antenna elements to compare the phase front of the received signal to measure the angle to the transponder, without utilising a rotating antenna.

The signal received in the interrogator is processed to find the beat frequencies and the Doppler frequencies for each transponder, and this is used to calculate the distance and the relative velocity between the interrogator and each of the transponders.

The angle between the interrogator and at least one transponder is calculated by comparing the receiving signal wave front on several receiving antenna elements.

The radar utilises FM-CW technology to get accurate interference resistant distance measurements.

This provides a method for positioning, which is suitable for several fields of utilisation. The transponders may, due to the construction of the interrogator, be of a simple design, making the cost of production low. The system is suitable for utilisation by several users, for example multiple supply vessels simultaneously.

BRIEF DESCRIPTION OF THE DRAWINGS

The present invention is, in the following, described in detail with reference to the drawings, wherein.

DESCRIPTION OF THE PREFERRED EMBODIMENTS

Figure 1:
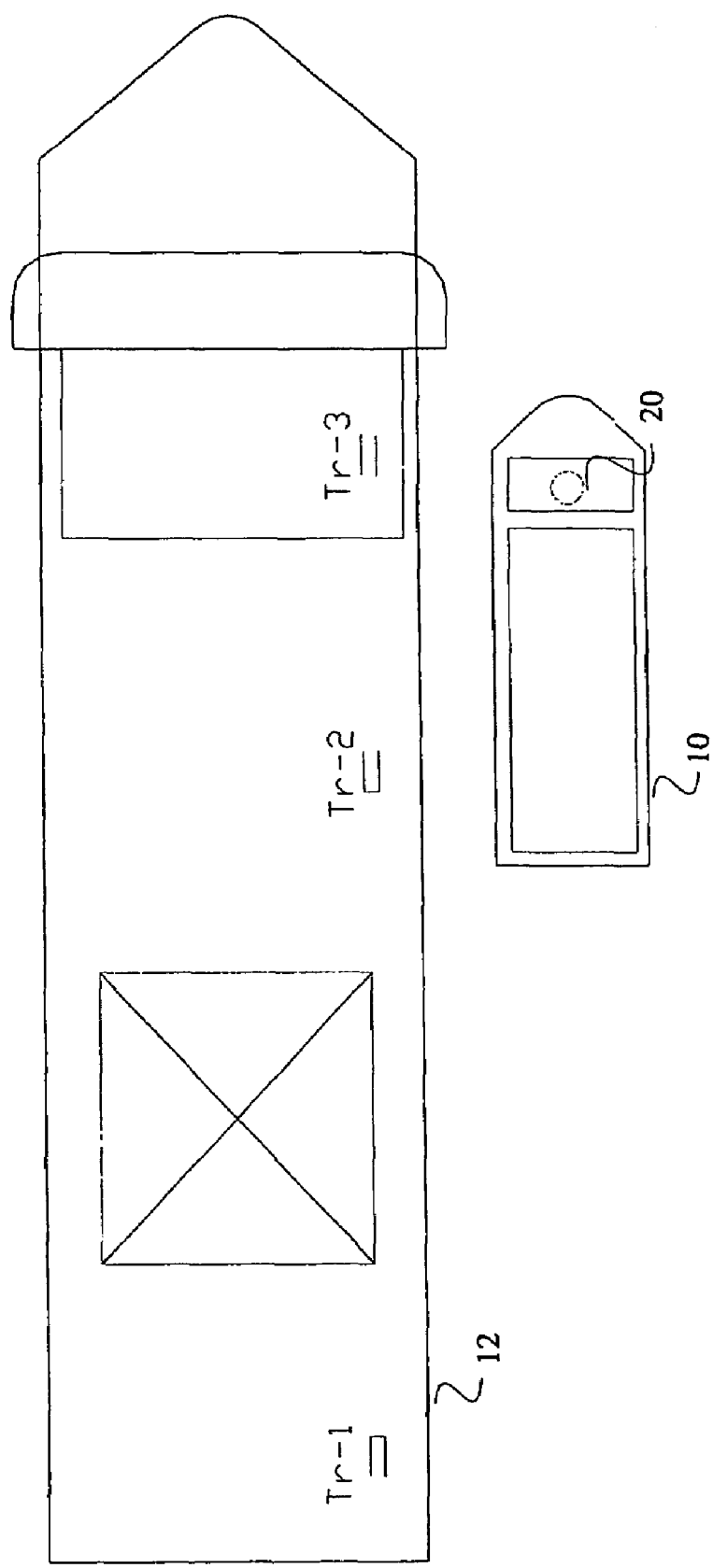
FIG. 1 is a schematic view of an oil drilling platform and a supply vessel whose position is to be determined.

In FIG. 1 the present invention is used for positioning a supply vessel 10 next to an oil drilling platform 12. The supply vessel is provided with an interrogator 20, which will be described in more detail later. The platform 12 is a floating production vessel, which has three transponders TR-1, TR-2 and TR-3 arranged along the docking side for the supply vessels 10.

Figure 2B:
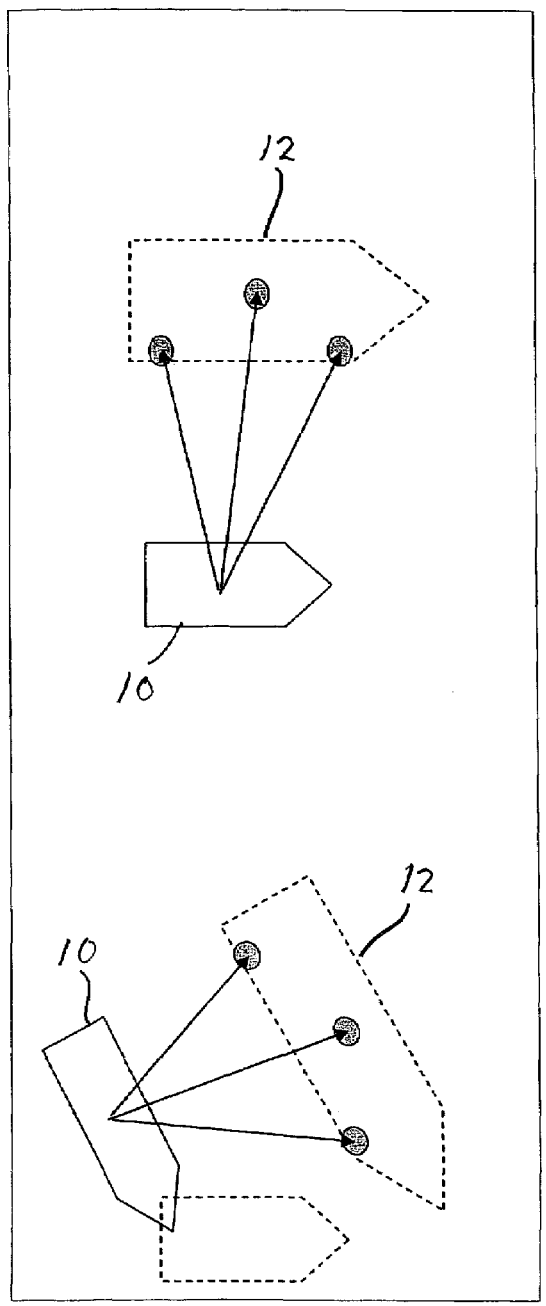
FIGS. 2a and 2b illustrate the invention in of use wherein the multiple transponder capacity is used to automatically follow a turning floating production unit.
Figure 2A:
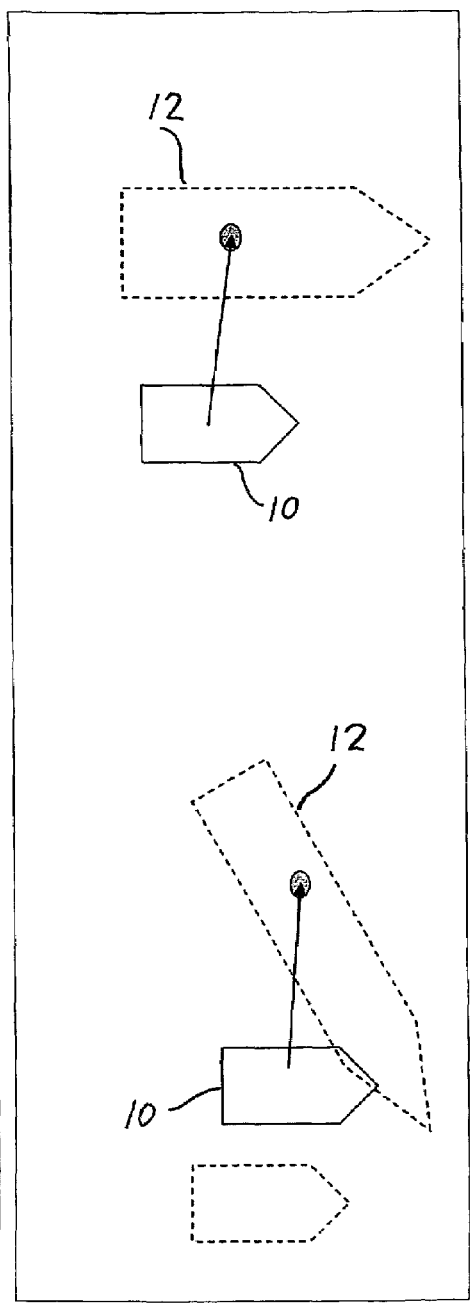

In FIG. 2a the docking of a supply vessel 10 with a system with one transponder Tr is shown. The Figure illustrates a collision with the production vessel 12, which potentially may occur. FIG. 2b illustrates the capability of correct tracking of the remote production vessels movement, and moves automatically with it, when multiple transponders Tr1 and Tr2 are utilised for positioning.

Figure 3:
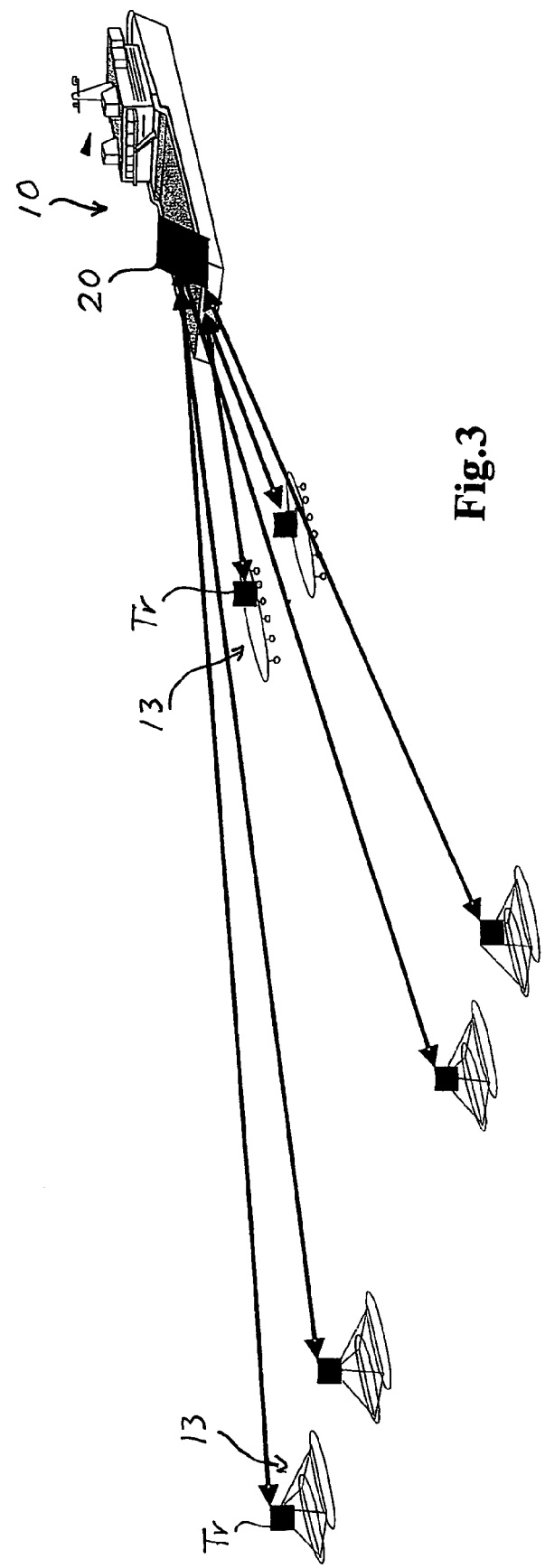
FIG. 3 illustrates the invention in use, with a seismic vessel that has drag and floats tied to this.

FIG. 3 illustrates a particular use of the system according to the invention, comprising an interrogator 20 arranged on a seismic vessel 10, and transponders Tr arranged on floats 13 and dragged behind the vessel 10. In this example, the mutual position of the transponders is not known, making it necessary to calculate the angle between the interrogator and each of the transponders.

Figure 4:
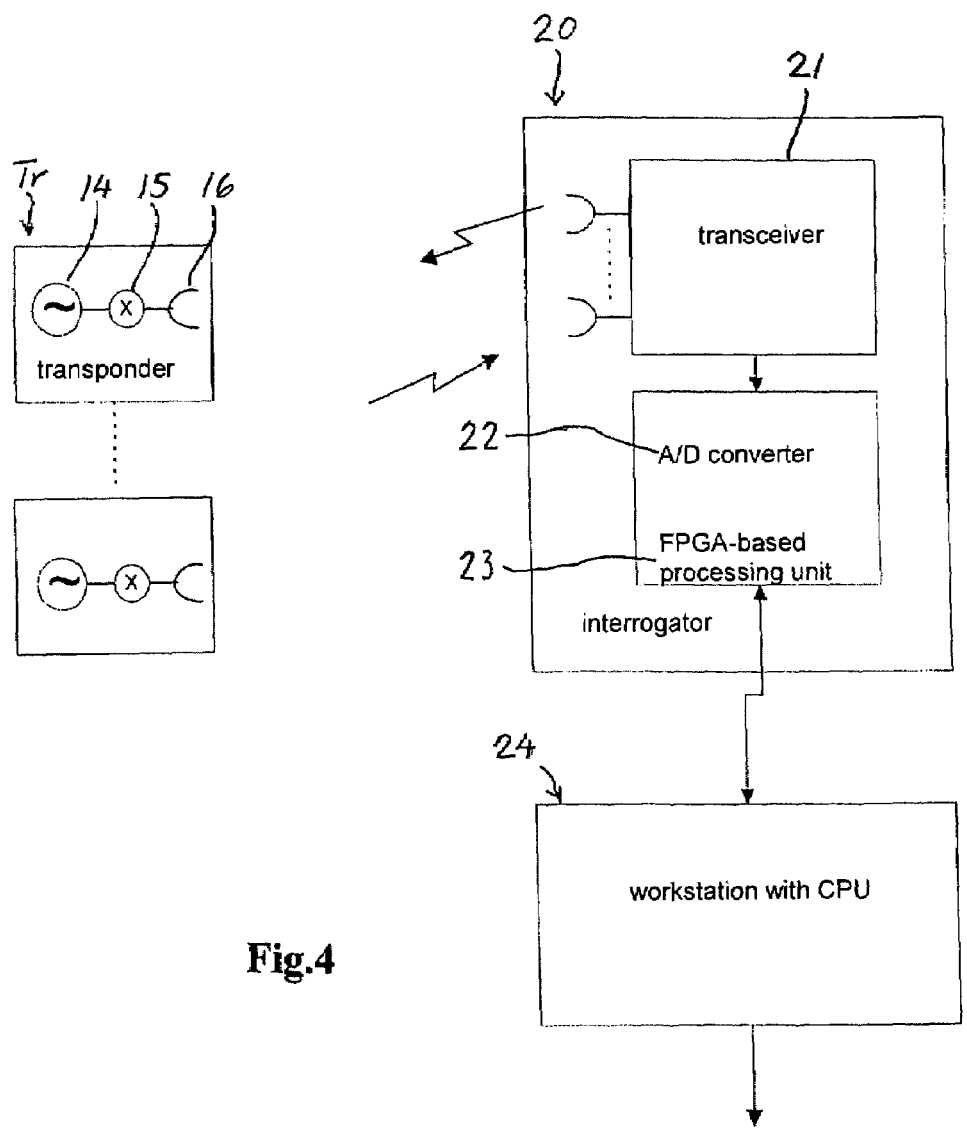
FIG. 4 is a schematic diagram of the system components.

A schematic drawing of the system in accordance with the invention is shown in FIG. 4. Each transponder Tr comprises a sideband oscillator 14, a mixer 15, and an antenna 16. The sideband oscillator 14 generates the sideband frequency that is used to shift the carrier of the received signals out in sidebands. These new sideband signals are then reflected to the interrogator 20 where they can be isolated from other received radio signals. Each transponder Tr can generate a different sideband frequency. This enables the interrogator 20 to both identify each transponder Tr, and remove all other "clutter" that conventional radars will recognize. The last property is crucial for the use of different statically located antenna elements to solve for the bearing to the transponder.

The system further comprises an interrogator 20 containing a transceiver 21, several A/D converters 22, and an FPGA based processing unit 23 (FPGA—Field Programmable Gate Array). A workstation with a central processing unit (CPU) 24 that has a user interface, is connected to the interrogator 20 via a LAN-network (LAN—Local Area Network).

Figure 5:
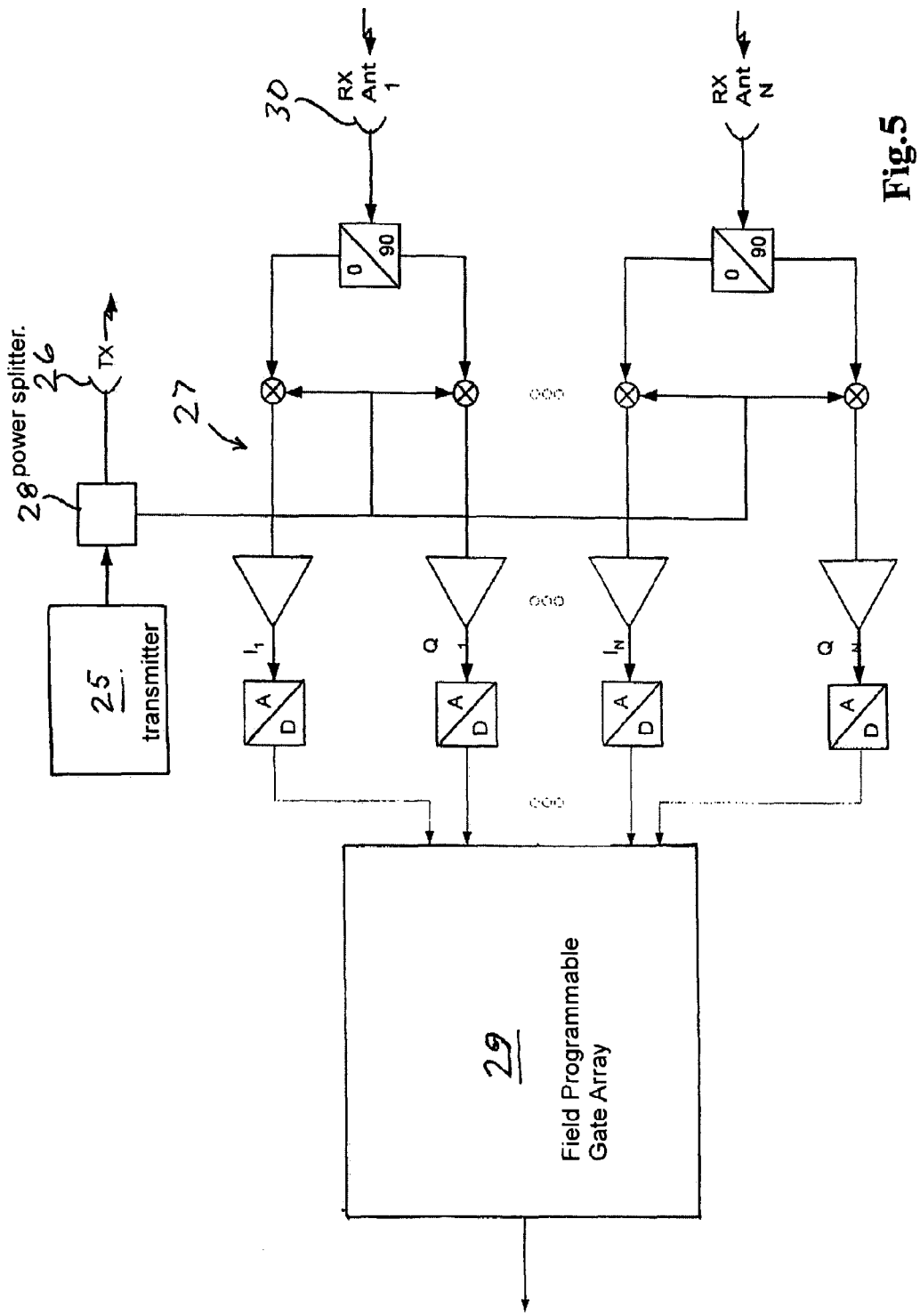
FIG. 5 is a schematic diagram of the interrogator.

The transceiver 21 and the processing in the FPGA will now be described with reference to FIG. 5. A transmitter 25 generates a triangular modulated signal, sweeping the frequency continually up and down over a wide frequency range. This signal drives both the transmitting antenna 26 and a quadrature mixer 27 for the receiving signals through a power splitter 28.

The receiving signal going through the quadrature mixer 27 is what generates complex signals (I and Q) that represent a vector representation of the received signal from the receiving antennas 30, where both phase angle and amplitude is represented. These signals are then amplified and converted to digital form. The digitized signal is fed into the processing FPGA 29.

The FPGA 29 will now divide the incoming signal into N number of channels. Each channel will be allocated to each transponder Tr to be tracked. Each transponder Tr has a unique identification frequency $F_{SC}$. Each channel in the FPGA 29 will then mix the incoming signal with its own identification frequency and isolate the signals from each transponder using digital filters.

Produced is a complex signal equivalent to a complex vector representing the amplitude and the phase for each upper and lower sideband, and for frequency sweep up and frequency sweep down. These signals are then transformed to the frequency plane by either FFT (FFT—Fast Fourier Transform) or/and tracking filters to produce the four variables $F_{lsb\_up}$, $F_{usb\_up}$, $F_{lsb\_dn}$, $F_{usb\_dn}$. Such complex vectors are achieved for all the antenna elements and the transponders (channels) measured for. These variables are the output from the FPGA 29 and are transferred via LAN to the central processing unit 24.

If it is desirable, the vectors may be used in calculation of the angle α between each transponder and interrogator. The angle α indicates the direction between the interrogator and each of the transponders.

By using the complex vectors, the phase difference $\Phi_{mz}$ between the antenna elements m and z may be calculated for each transponder. If the antenna elements have a mutual distance less than $\lambda/2$ ($\lambda$ is the wavelength for $F_c$), $\Phi_{mz}$ may be used to determine the angle α. The accuracy of the angle α is, however, limited due to the short distance between the antenna elements. The antenna elements are therefore distributed further away from each other to increase the accuracy of the estimation of α. One way of doing this is to increase the distance by continuing to distribute the elements in a matrix, where the elements have a distance $\lambda/2$ between each other (this is named the "phase array radar principle"). This quickly results in many elements to process. In the present invention this is done by placing one or more of the antenna elements up to several wavelengths away from the other antenna elements.

If the elements are distributed both horizontally and vertically, then the angle θ can be solved for the elevation of the transponder, and thereby make it possible to determine the location of the transponders in three dimensions.

The variables $F_{lSb\_up}$, $F_{usb\_up}$, $F_{lsb\_dn}$, $F_{usb\_dn}$ are also the measured frequencies containing following information (generalised).

| | |
|---|---|
| $F_{lsb\_up} = -\delta + Fb - Fd$ | Measured frequency, Lower Sideband, Up Sweep |
| $F_{usb\_up} = \delta + Fb - Fd$ | Measured frequency, Upper Sideband, Up Sweep |
| $F_{lsb\_dn} = -\delta - Fb - Fd$ | Measured frequency, Lower Sideband, Down Sweep |
| $F_{usb\_dn} = \delta - Fb - Fd$ | Measured frequency, Upper Sideband, Down Sweep |

Where
δ - The transponder frequency error.
Fb - The beat frequency (proportional with the distance to the transponder)
Fd - The Doppler frequency (proportional with the relative velocity to the transponder)

The equations above can now be solved for the distance, the relative velocity, and preferably the angle between the interrogator and each of the transponders, which is accordingly sent as an input to the DP-system.

The present invention also has other fields of utilisation. For seismic vessels there are needs for positioning the seismic sensors and to control the floats dragging behind the vessel, to position the sensors and the floats in the desired position in relation to each other. Currently, among others, GPS-systems are used for this. A disadvantage with prior art systems is that the GPS-receivers may be submerged below the surface of the sea, which is an undesirable location for receiving the signals from the GPS-satellites. If two or more transponders are located on the towed floats, then the relative difference between the transponders can be accurately determined, and thereby the direction of the floats can be calculated.

By using the invention it is possible to measure the accurate position of a random transponder. The direction from the interrogator to each transponder is accurately determined by the rapid processing of data, such as the relative velocities between units to be manoeuvred, and the transponders. The invention makes it possible to operate independently of a GPS-signal.

The invention claimed is:

1. System for determining the relative position between two or more objects in a marine environment, of which at least one object can be maneuvered relative to one or more other objects, comprising:
   at least one interrogator using frequency modulated continuous wave radar arranged on one of the objects, and at least one transponder arranged on at least one other object, the interrogator constructed and arranged to transmit a radio signal to the at least one transponder, the at least one transponder constructed and arranged to generate a different sideband frequency to introduce an identity tag into a signal to be reflected to the interrogator,
   a signal processing unit with software containing algorithms for determination of ranges, velocities and angles to transponders, and
   a fixed transponder is provided on the same object as the interrogator, for continuous self calibration and integrity monitoring.

2. System according to claim 1, wherein the interrogator is implemented with non-moving elements.

3. A method for determining the relative position between two or more objects in a marine environment, of which at least one object can be maneuvered relative to one or more other said objects, comprising the steps of:
   arranging at least one interrogator on at least one of said objects and arranging a transponder on at least one of said other objects, the interrogator being constructed and arranged for sending a radio signal to the transponder;
   using the transponder to reflect a radio wave signal to the interrogator;
   operating the interrogator using frequency modulated continuous wave radar;
   using the transponders to bring identity tags into the radio signal reflected to the interrogator, and
   carrying out attitude determination, determining range and bearing between the interrogator and transponder, wherein:
   at least one interrogator sends a radio signal to at least one transponder arranged on an object for relative positioning,
   at least one transponder modulates an identifier frequency into the signal from the interrogator prior to the signal being reflected to the interrogator,
   the signals from the transponders are received by a series of antenna elements in the interrogator,
   the combination of the signals received on different antenna elements is used to determine the angles to the transponders in two planes relative to the antenna elements geometry,
   the signals from the transponders are processed to determine the beat frequencies and the Doppler frequencies for each transponder,
   the distance and the relative velocity between the interrogator and each of the transponders are determined, which from the frequency of the carrier signal, can determine the identity of the signal and on this basis determine the position data, and
   a fixed transponder is provided on the same object as the interrogator for continuous self calibration and integrity monitoring.

4. Method according to claim 3, wherein at least one interrogator simultaneously interrogates multiple transponders.

5. Method according to claim 3, wherein an interrogator is operated autonomously towards any transponder.

6. Method according to claim 4, wherein the interrogator illuminates all the transponders simultaneously.

7. Method according to claim 3, comprising combining the distance and angles in two planes, for positioning of one or more transponders in 3 dimensions.

8. Method according to claim 3, comprising combining the relative distance and angles with attitude determination systems, to provide an absolute determination of transponders or interrogators.

9. Method according to claim 3, wherein a position determination of the interrogator from ranges is obtained, when the relative or absolute position of the transponders is known.

10. A method for determining the relative position between two or more objects in a marine environment, of which at least one object can be maneuvered relative to one or more other said objects, comprising the steps of:

arranging at least one interrogator on at least one of said objects and arranging a transponder on at least one of said other objects, the interrogator being constructed and arranged for sending a radio signal to the transponder;

using the transponder to reflect a radio wave signal to the interrogator;

operating the interrogator using frequency modulated continuous wave radar;

using the transponders to bring identity tags into the radio signal reflected to the interrogator, and carrying out attitude determination, determining range and bearing between the interrogator and transponder, wherein:

at least one interrogator sends a radio signal to at least one transponder arranged on an object for relative positioning, at least one transponder modulates an identifier frequency into the signal from the interrogator prior to the signal being reflected to the interrogator, the signals from the transponders are received by a series of antenna elements in the interrogator, the combination of the signals received on different antenna elements is used to determine the angles to the transponders in two planes relative to the antenna elements geometry, the signals from the transponders are processed to determine the beat frequencies and the Doppler frequencies for each transponder, the distance and the relative velocity between the interrogator and each of the transponders are determined, which from the frequency of the carrier signal, can determine the identity of the signal and on this basis determine the position data, and a differential positioning between two or more transponders is carried out.

11. Method according to claim 10, wherein at least one interrogator simultaneously interrogates multiple transponders.

12. Method according to claim 10, wherein an interrogator is operated autonomously towards any transponder.

13. Method according to claim 11, wherein the interrogator illuminates all the transponders simultaneously.

14. Method according to claim 10, comprising combining the distance and angles in two planes, for positioning of one or more transponders in 3 dimensions.

15. Method according to claim 10, comprising combining the relative distance and angles with attitude determination systems, to provide an absolute determination of transponders or interrogators.

16. Method according to claim 10, wherein a fixed transponder on the same object as the interrogator is used for continuous self calibration and integrity monitoring.

17. Method according to claim 10, wherein a position determination of the interrogator from ranges is obtained, when the relative or absolute position of the transponders is known.

* * * * *